(12) United States Patent
Keiser

(10) Patent No.: US 9,303,414 B1
(45) Date of Patent: Apr. 5, 2016

(54) GRAIN BIN BOLT COVER

(71) Applicant: Daryl B. Keiser, Nokomis, IL (US)

(72) Inventor: Daryl B. Keiser, Nokomis, IL (US)

( * ) Notice: Subject to any disclaimer, the term of this patent is extended or adjusted under 35 U.S.C. 154(b) by 0 days.

(21) Appl. No.: 14/617,107

(22) Filed: Feb. 9, 2015

Related U.S. Application Data

(60) Provisional application No. 61/937,675, filed on Feb. 10, 2014.

(51) Int. Cl.
*E04F 19/04* (2006.01)
*A01F 25/14* (2006.01)

(52) U.S. Cl.
CPC ............. *E04F 19/0486* (2013.01); *A01F 25/14* (2013.01); *E04F 19/0459* (2013.01); *E04F 2019/0413* (2013.01)

(58) Field of Classification Search
CPC ..... E04F 13/06; E04F 2013/063; E04F 19/04; E04F 19/0486; E04F 19/0459; E04F 2019/0413
USPC ......... 52/58, 60, 192, 273, 287.1, 288.1, 290, 52/718.01, 718.02
See application file for complete search history.

(56) References Cited

U.S. PATENT DOCUMENTS

| | | | | | |
|---|---|---|---|---|---|
| 1,396,732 | A | * | 11/1921 | Cramer | E04D 13/1415 52/58 |
| 2,343,201 | A | * | 2/1944 | Nilson | A47K 3/283 4/612 |
| 2,365,129 | A | * | 12/1944 | Winding | E04D 13/1415 52/518 |
| 2,994,905 | A | * | 8/1961 | Franker, Jr. | E04F 19/0495 16/16 |
| 3,344,569 | A | * | 10/1967 | Cotten | E04B 1/7023 52/287.1 |
| 3,533,201 | A | * | 10/1970 | Tyler | E04D 13/155 52/60 |
| 3,585,766 | A | * | 6/1971 | Jamieson | E04D 13/155 52/60 |
| 3,624,973 | A | * | 12/1971 | Attaway | E04D 13/155 52/60 |
| 3,638,374 | A | * | 2/1972 | Harby | E04B 2/82 52/100 |
| 3,663,986 | A | * | 5/1972 | Harby | A47G 27/0456 16/7 |
| 3,741,593 | A | * | 6/1973 | Toti | E04B 1/6112 403/278 |
| 3,925,952 | A | * | 12/1975 | Hagel | E04B 2/92 52/235 |
| 3,977,112 | A | * | 8/1976 | Breer, II | G09F 1/12 40/661 |
| 4,052,828 | A | * | 10/1977 | Mancini | E04B 2/7409 52/242 |
| 4,091,586 | A | * | 5/1978 | Schwartz | A47K 3/008 52/287.1 |
| 4,241,549 | A | * | 12/1980 | Hall, III | E04D 13/155 52/60 |
| 4,244,151 | A | * | 1/1981 | Seem | E04D 3/351 52/309.9 |
| 4,333,281 | A | * | 6/1982 | Scarfone | E02D 31/02 52/169.5 |
| 4,404,777 | A | * | 9/1983 | Lolley | E04D 13/155 52/60 |
| 4,483,112 | A | * | 11/1984 | Rueblinger | E04D 13/155 52/58 |
| 4,603,517 | A | * | 8/1986 | Lyons, Jr. | E04D 13/1407 52/219 |
| 4,660,333 | A | * | 4/1987 | Romer | E02D 31/02 52/169.9 |

(Continued)

*Primary Examiner* — Brian Glessner
*Assistant Examiner* — Adam Barlow
(74) *Attorney, Agent, or Firm* — Philip L. Bateman

(57) ABSTRACT

A grain bin bolt cover prevents a shovel, a broom, or other tool from being caught on an exposed bolt in the interior of a grain bin. The cover has a vertical side, an angled side, and a horizontal base. The vertical side contains at least one opening for accommodation of the bolt.

10 Claims, 4 Drawing Sheets

(56) References Cited

U.S. PATENT DOCUMENTS

| | | | | |
|---|---|---|---|---|
| 4,780,995 A * | 11/1988 | Gittins | E04D 13/155 | 52/60 |
| 4,800,689 A * | 1/1989 | Lane | E04D 13/155 | 52/60 |
| 5,289,663 A * | 3/1994 | Schluter | E04F 15/02005 | 52/287.1 |
| 5,404,684 A * | 4/1995 | Schwendeman | A47B 47/0041 | 52/282.2 |
| 6,115,982 A * | 9/2000 | Lindenberg | A47B 77/022 | 52/272 |
| 6,381,915 B1 * | 5/2002 | Wood | E04F 19/02 | 248/617 |
| 6,421,971 B1 * | 7/2002 | Gembala | E04D 3/405 | 52/302.6 |
| 7,200,970 B2 * | 4/2007 | Koenig, Jr. | E04F 19/02 | 52/255 |
| 7,712,263 B1 * | 5/2010 | Lippie | E04B 1/72 | 52/101 |
| 8,640,397 B2 * | 2/2014 | Donoho | A01M 29/32 | 52/101 |
| 9,010,046 B1 * | 4/2015 | Reilly | B44C 7/022 | 160/327 |
| 2002/0157325 A1 * | 10/2002 | Domanico | A47K 3/008 | 52/35 |
| 2005/0284055 A1 * | 12/2005 | Piche | E04F 19/045 | 52/287.1 |
| 2008/0245006 A1 * | 10/2008 | Rachak | E04F 19/04 | 52/287.1 |
| 2013/0235564 A1 * | 9/2013 | Barcelos | F21V 33/006 | 362/151 |

* cited by examiner

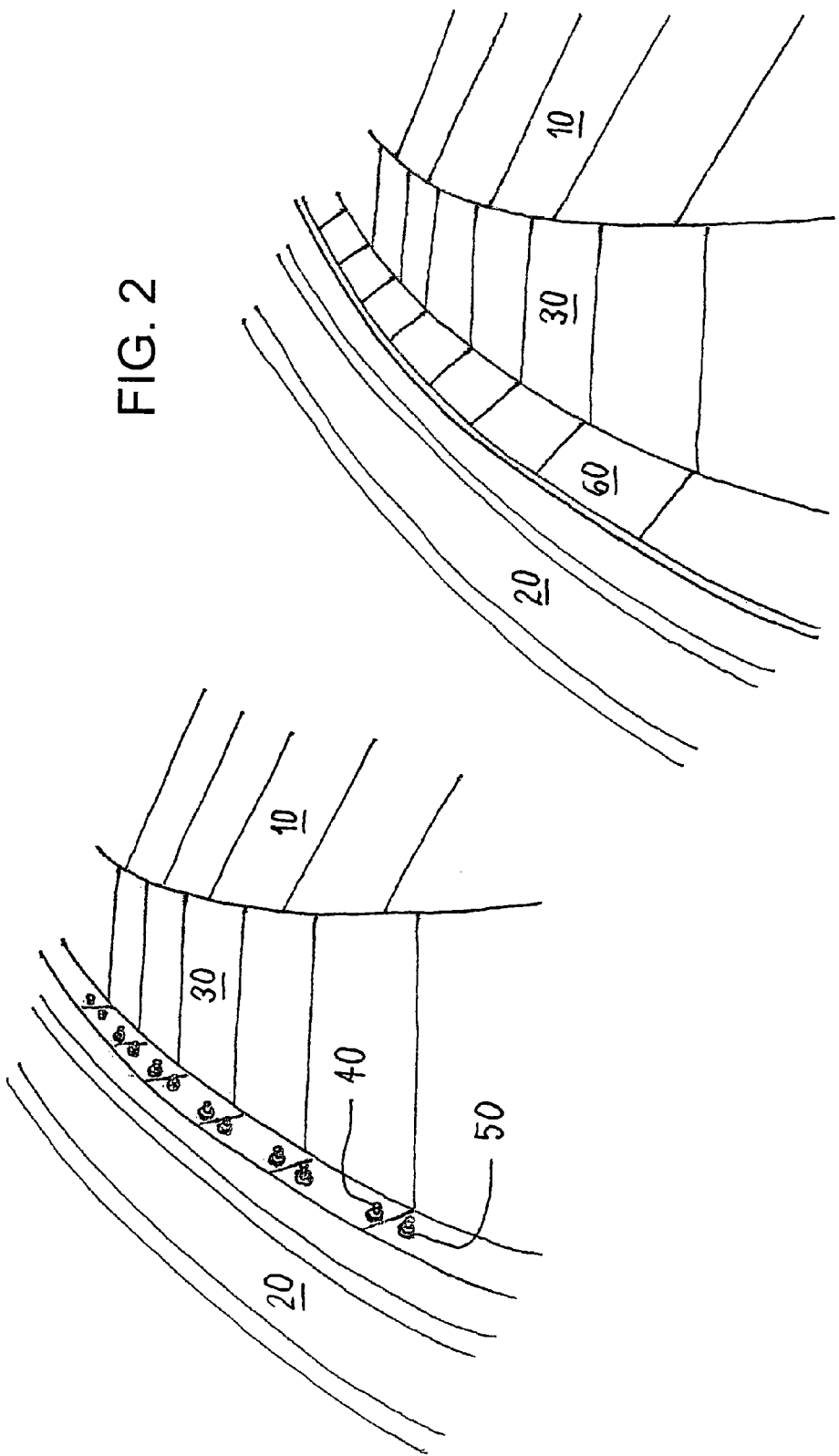

US 9,303,414 B1

GRAIN BIN BOLT COVER

CROSS-REFERENCE TO RELATED APPLICATION

This application claims the benefit of U.S. Provisional Application Ser. No. 61/937,675, Feb. 10, 2014.

FIELD OF THE INVENTION

This invention relates to static structures. More particularly, this invention relates to grain bins.

BACKGROUND OF THE INVENTION

Grain bins are structures used to store grain. Many farms contain cylindrical grain bins made of a corrugated metal shell on a concrete foundation. Farm grain bins typically have a diameter of about twenty to forty feet, a height of about ten to forty feet, and a capacity of about 3,000 to 50,000 cubic feet (about 2,500 to 40,000 bushels).

Farm grain bins are often constructed with right-angled flashing sections at the interface of the floor and wall located around the perimeter. The flashing sections provide an excellent seal because they are of one piece. The horizontal portions of the flashing sections are attached to the floor and the vertical portions of the flashing sections are attached to the corrugated metal wall. Referring to FIG. 1, a grain bin has a floor 10 comprising horizontal perforated flooring sections 10, a vertical corrugated wall 20, and perforated flashing sections 30 at the interface of the floor and wall. The flashing sections overlie the flooring sections and are attached to the wall with bolts 40 and nuts 50 that project into the interior space of the grain bin. The means for attaching the flashing sections to the floor and the perforations in the floor sections and the flashing sections are omitted from FIG. 1 for clarity.

Many variations of interfaces of the floor and wall in grain bins have been disclosed, including those disclosed in Hagel et al., U.S. Pat. No. 3,925,952, Dec. 16, 1975; Guenther, U.S. Pat. No. 4,287,691, Sep. 8, 1981; Carroll et al., U.S. Pat. No. 4,562,678, Jan. 7, 1986; Brockhaus et al., U.S. Pat. No. 4,589,332, May 20, 1986; and Liefer et al., U.S. Pat. No. 4,709,519, Dec. 1, 1987. The Guenther, Carroll et al., and Brockhaus et al. flashings contain inwardly projecting bolts. The Liefer et al. interface does not contain bolts.

Farm grain bins are typically loaded by conveying the grain in an auger (also known as a screw conveyor) from ground level to the top of the bin. The grain is then dropped down into the center of the bin. Farm grain bins are typically unloaded with a sweep auger that rotates slowly about an anchored center point around the floor of the bin on one or more wheels located at or near the distal end of the auger. The sweep auger moves the grain to a central chute. The grain falls through the central chute and then enters another auger located below the floor that carries the grain to a hopper outside the bin.

A sweep auger does not remove a small volume of grain at the interface of the floor and wall. It is undesirable to leave this grain in the bin for long periods of time because it attracts vermin and insects. Any significant amount of grain left in the bin can also lead to problems with mold. Accordingly, this small amount of grain is typically removed manually with a shovel, a broom, or other tool. The inwardly projecting ends of the bolts can interfere with the tool. Accordingly, there is a demand for a grain bin bolt cover that prevents a shovel, a broom, or other tool from becoming caught on an exposed bolt.

SUMMARY OF THE INVENTION

The general object of this invention is to provide an improved grain bin bolt cover that prevents a shovel, a broom, or other tool from becoming caught on an exposed bolt.

I have invented a cover for a grain bin bolt that attaches a vertical wall section to a section of flashing on a perimeter of a grain bin floor. The cover comprises a sheet of material having a vertical side, an angled side, and a horizontal base. The vertical side is adapted for mounting against a vertical portion of flashing and has an upper edge, a lower edge, and at least one opening for accommodation of a bolt. The angled side has an upper edge and a lower edge, the upper edge of the angled side being connected to the upper edge of the vertical side, and the angled side forming an angle to the horizontal of about 10 to 80 degrees. The horizontal base is adapted for resting on a horizontal portion of the flashing or the floor.

The grain bin bolt cover of this invention prevents a shovel, a broom, or other tool from becoming caught on an exposed bolt. The cover is inexpensive, easy to install, and has a negligible effect on the capacity of the grain bin.

BRIEF DESCRIPTION OF THE DRAWINGS

FIG. 1 is a perspective view of a prior art grain bin interior.

FIG. 2 is a perspective view thereof with several grain bin bolt covers of the first embodiment of this invention installed.

DETAILED DESCRIPTION OF THE INVENTION

Figure 4:
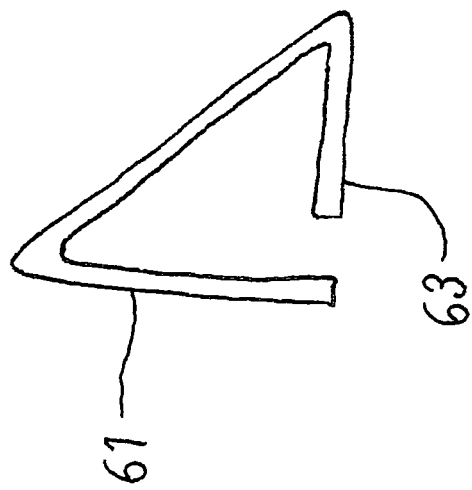
FIG. 4 is a left side elevation view thereof.
Figure 3:
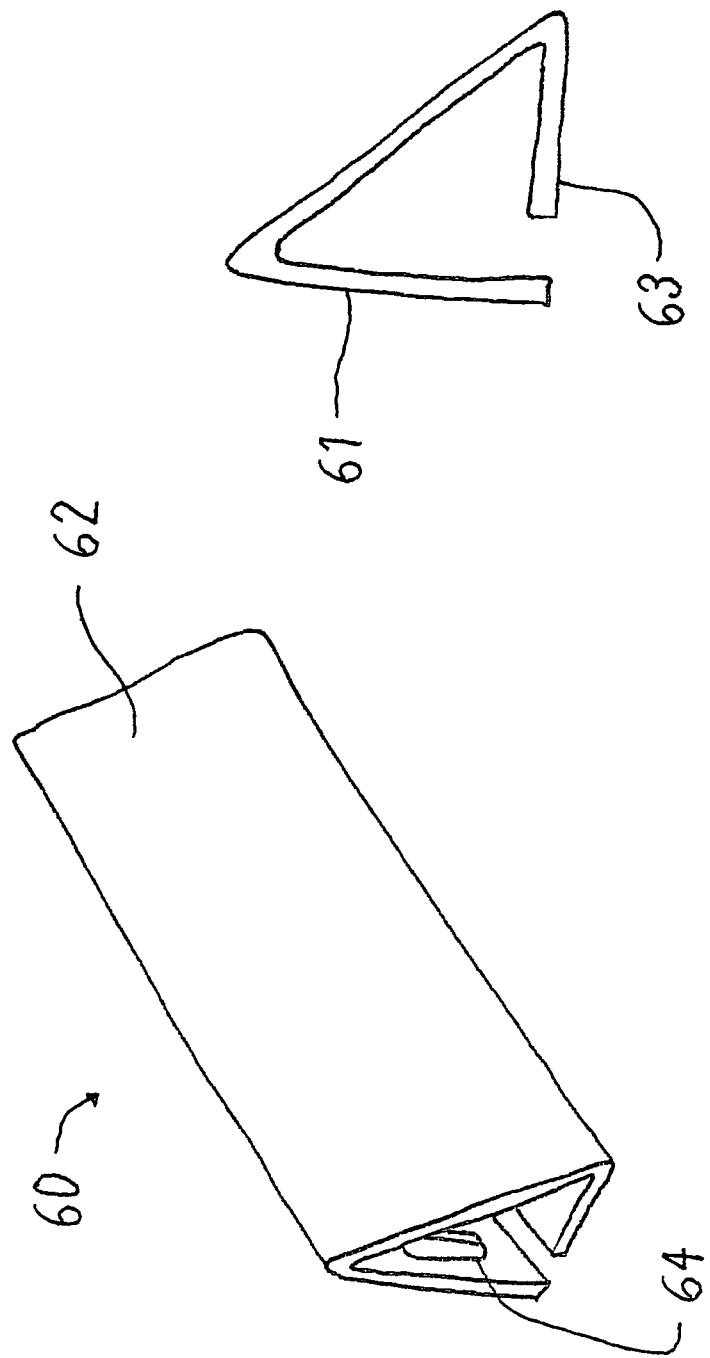
FIG. 3 is a front and left side perspective view of a first embodiment of the grain bin bolt cover of this invention.

This invention is best understood by reference to the drawings. Referring first to FIGS. 3 and 4, a first embodiment of the grain bin bolt cover 60 of this invention comprises a generally rectangular metal sheet bent to form three sides, a vertical side 61, an angled side 62, and a base 63. As best seen in FIG. 4, the first embodiment of the cover has a cross section in the shape of a right triangle. The grain bin bolt cover is installed along the interior perimeter of a grain bin as shown in FIG. 2. When the covers are installed along the entire perimeter, the possibility of a shovel, a broom, or other tool becoming caught on an exposed bolt is eliminated.

The vertical side contains one or more openings 64 to accommodate the threaded end of a grain bin bolt. The vertical side generally contains two such openings. As discussed in detail below, the angled side optionally contains one or more openings to provide access to each bolt for installation of the washer and nut. The angled side generally contains two such openings. The base of the cover rests upon the flashing section that, in turn, rests upon the floor.

The size of the cover is a matter of choice that depends on the grain bin. The cover is generally about one to four inches in height, about one to four inches in depth (distance from front to back), and about six to twenty-four inches in width. The preferred embodiment has a height of about two inches, a depth of about two inches, and a width of about ten inches.

The cover is made of a durable, waterproof material. The preferred embodiment is made of galvanized steel having a thickness of about one-thirty-second inch. The material is preferably perforated to allow the flow of air. Perforations also save cost and weight and make the material more easily bendable. In FIGS. 2 to 4, the perforations in the cover are omitted for clarity. The perforations are generally small (having a diameter less than about one-half inch and a cross-section area of less than about one-quarter square inch).

The cover is installed by placing it at the interface of the floor and wall, aligning its openings over the exposed threaded ends of the grain bin bolts, and then placing the appropriate washers and nuts onto the bolts to secure the cover in place. If the cover is made of an easily bendable material, installation is simplified by bending the cover open so that the washers and nuts are more easily accessible and then bending the cover back into the closed position. As previously mentioned, one or more openings are optionally included in the angled side to provide easy access to the bolts for installation of the washers and nuts without having to bend the material. An opening in the angled side is shown on the second embodiment discussed below. The openings in the vertical side and angled side are larger than any perforations and typically have a cross-section area of at least about three-fourths square inches.

If desired, the cover is also attached to the flooring sections. Self-tapping screws that are driven down vertically through the angled side, through the base, and into the underlying floor provide one easy means of attachment.

It can be appreciated that rectangular covers do not fit perfectly around a circular perimeter. In FIG. 4, the covers overlay each other slightly to provide a continuous surface. If desired, the sides of the covers are angled slightly inwardly (converge from the wall to the center of the floor when viewed from above) so they form a flush fit with adjacent covers. It can also be appreciated that the first embodiment is suitable for addition to an existing grain bin having flashing sections already installed.

Figure 5:
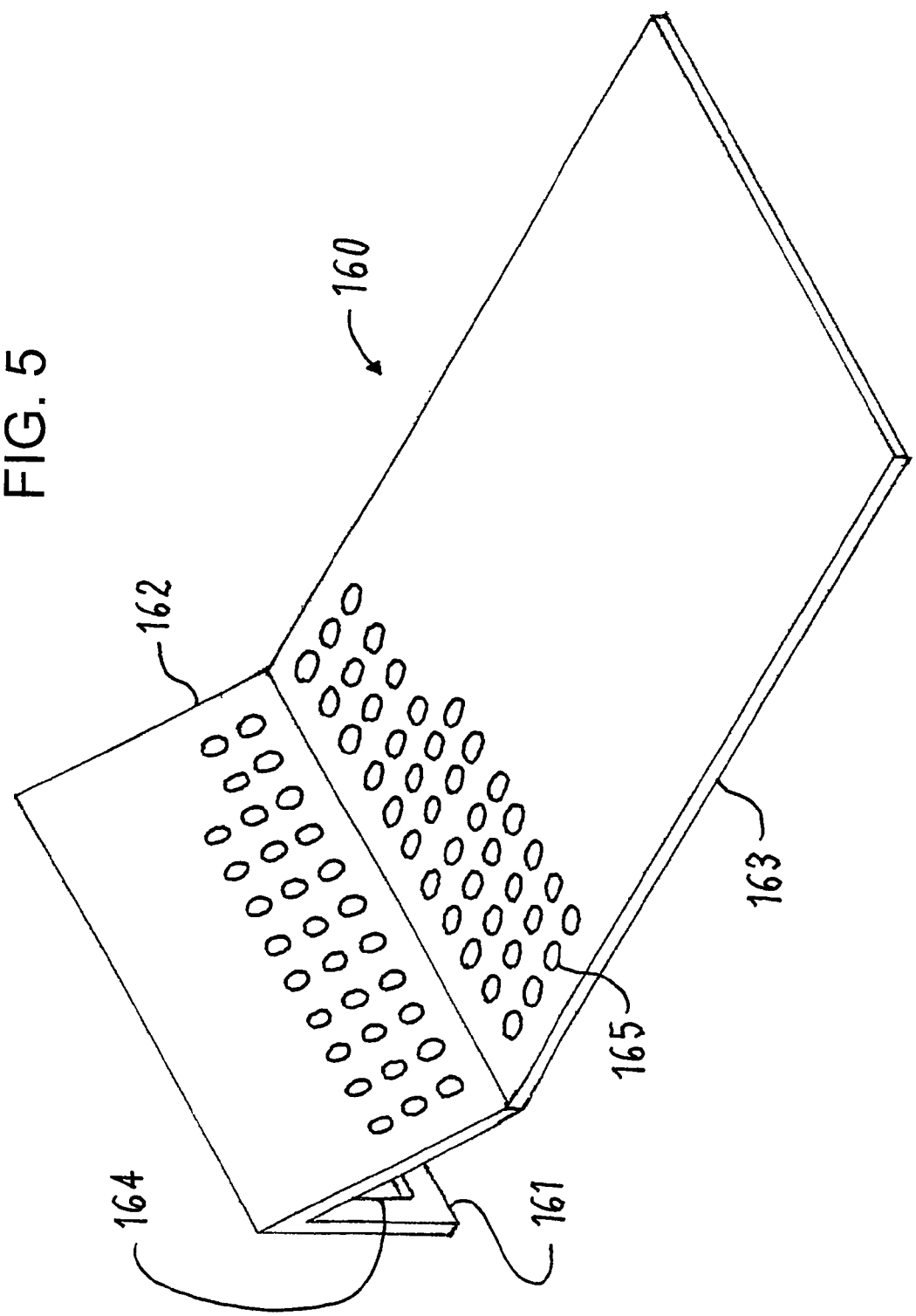
FIG. 5 is a front and left side perspective view of a second embodiment of the grain bin bolt cover of this invention.

Referring now to FIG. 5, a second embodiment 160 of the grain bin bolt cover of this invention is incorporated into a flashing section. The second embodiment is especially adapted for new construction. The second embodiment includes a vertical side 161, an angled side 162, a base 163, and an opening 164 in the vertical side to accommodate the threaded end of the bolt. The structure of the second embodiment is similar to the first embodiment with the exception that the base is part of the flashing and extends from the angled side away from the vertical side rather than towards the vertical side. The second embodiment is installed by bending the cover open so that the washers and nuts are accessible and then bending the cover back into the closed position. The perforations 165 in the material are shown.

Figure 6:
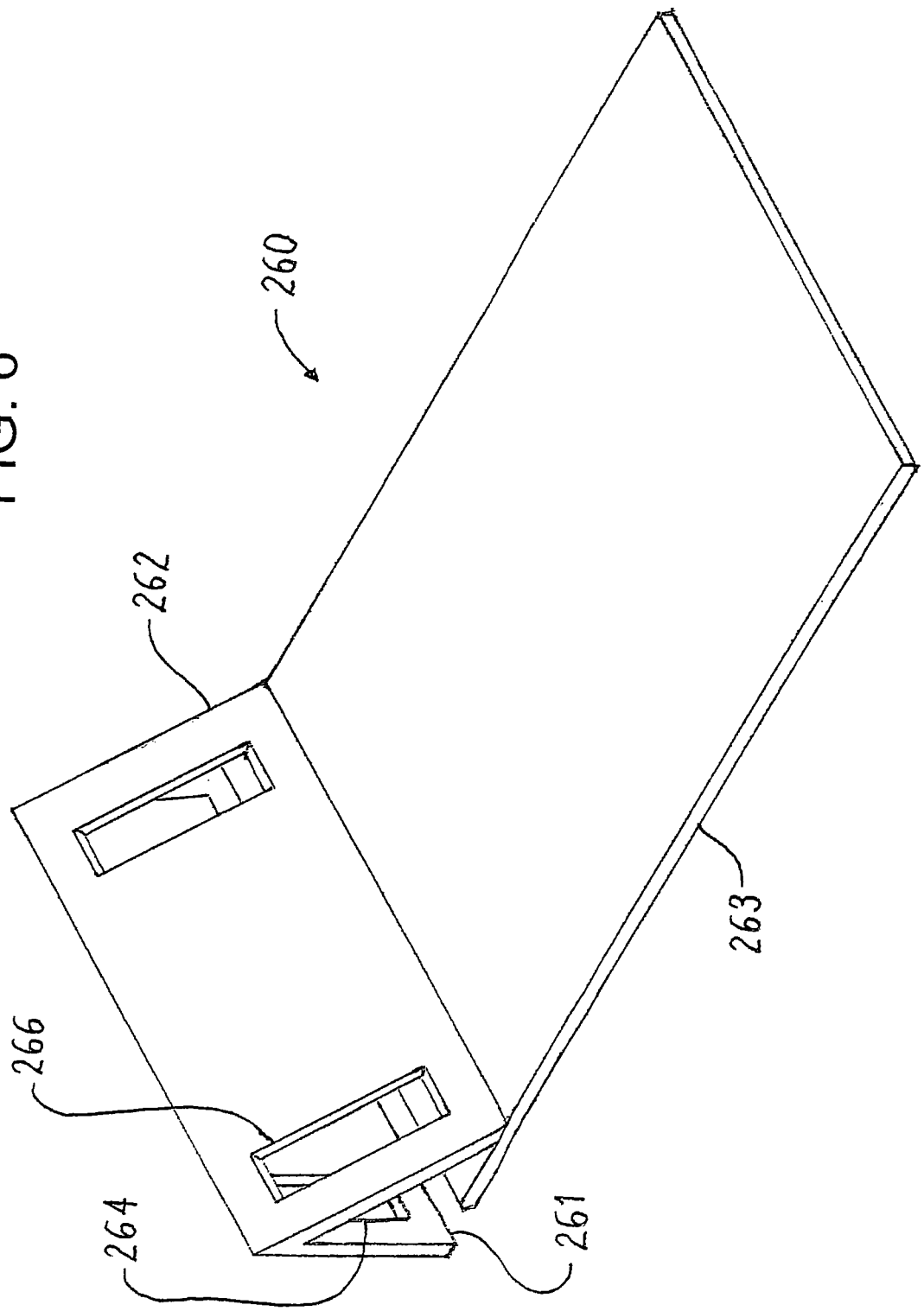
FIG. 6 is a front and left side perspective view of a second embodiment of the grain bin bolt cover of this invention.

Referring now to FIG. 6, a third embodiment 260 of the grain bin bolt cover of this invention is also incorporated into a flashing section. The third embodiment includes a vertical side 261, an angled side 262, a base 263, two opening 264 in the vertical side to accommodate the threaded ends of two bolts, and two openings 266 in the angled side to provide access for installing a washer and nut on each bolt. The base of the third embodiment differs slightly from the base of the second embodiment in that it extends from the angled side both towards the vertical side and away from the vertical side. The perforations are omitted for illustration purposes.

I claim:

1. A grain bin comprising:
   (a) a horizontal floor having a perimeter;
   (b) a vertical wall extending upwardly from the perimeter of the floor;
   (c) a plurality of flashing sections along the perimeter of the floor, each of which has a vertical portion attached to the wall with at least one bolt and a horizontal portion resting upon the floor; and
   (d) a plurality of bolt covers, each cover comprising a sheet of material being perforated throughout with uniformly sized and spaced holes and having a vertical side, an angled side, and a horizontal base and wherein: (i) the vertical side is mounted against the vertical portion of the flashing, the vertical side having an upper edge, a lower edge, and at least one opening for accommodation of a bolt; (ii) the angled side has an upper edge and a lower edge, the upper edge of the angled side being connected to the upper edge of the vertical side, the angled side forming an angle to the horizontal floor of about 10 to 80 degrees, and (iii) the horizontal base rests on the horizontal portion of the flashing or the floor.

2. The grain bin of claim 1 wherein each sheet of material for the bolt cover is made of metal.

3. The grain bin of claim 1 wherein the vertical side of each bolt cover has a single opening for accommodation of a bolt.

4. The grain bin of claim 1 wherein the angled side of each bolt cover has at least one opening to provide access for installing a nut upon a bolt.

5. A grain bin comprising:
   (a) a horizontal floor having a perimeter;
   (b) a vertical wall extending upwardly from the perimeter of the floor; and
   (c) a plurality of integral grain bin bolt cover and flashing sections attached to the grain bin along the perimeter of the floor, each integral cover and flashing section comprising a sheet of material having a plurality of uniformly sized and spaced perforations, a vertical side, an angled side, and a horizontal base and wherein: (a) the vertical side is mounted against the wall and wherein the vertical side has an upper edge, a lower edge, and at least one opening for accommodation of a bolt; (b) the angled side has an upper edge and a lower edge, the upper edge of the angled side being connected to the upper edge of the vertical side, the angled side forming an angle to the horizontal floor of about 10 to 80 degrees, and (c) the horizontal base is connected to the lower edge of the angled side and rests on the grain bin floor.

6. The grain bin of claim 5 wherein the base extends away from the vertical side.

7. The grain bin of claim 5 wherein the sheet of material is made of metal.

8. The grain bin of claim 5 wherein the vertical side has a single opening.

9. The grain bin of claim 5 wherein the angled side has at least one opening to provide access for installing a nut upon a bolt.

10. A grain bin comprising:
   (a) a horizontal floor having a perimeter;
   (b) a vertical wall extending upwardly from the perimeter of the floor;
   (c) a plurality of flashing sections having a vertical portion and a horizontal portion and that are secured to the vertical wall with at least one bolt; and
   (d) a plurality of covers for the bolts attaching the flashing sections to the vertical wall, each cover comprising:
      (i) a vertical side mounted against the vertical portion of a flashing section, the vertical side having an upper edge, a lower edge, and at least one opening for accommodation of a bolt;
      (ii) an angled side having an upper edge and a lower edge, the upper edge of the angled side being connected to the upper edge of the vertical side, the angled side forming an angle to the horizontal of about 10 to 80 degrees; and (iii) a horizontal base resting on the horizontal portion of a flashing section or on the floor, the horizontal base having a proximate end connected to the lower edge of the angled side, the horizontal base extending away from the vertical side;

and wherein the angled side and the horizontal base of the covers are substantially completely perforated with a series of uniformly sized perforations arranged in a plurality of rows and a plurality of columns to facilitate air flow through the angled side and the horizontal base.

* * * * *